United States Patent
Rajala et al.

(10) Patent No.: US 6,628,485 B1
(45) Date of Patent: Sep. 30, 2003

(54) APPARATUS FOR LIMITING AN ELECTRICAL CURRENT

(75) Inventors: Erkki Rajala, Vaasa (FI); Ralf Strümpler, Gebenstorf (CH); Joachim Glatz-Reichenbach, Baden (CH); Timo Jokiniemi, Vaasa (FI)

(73) Assignee: ABB Research Ltd, Zurich (CH)

( * ) Notice: Subject to any disclaimer, the term of this patent is extended or adjusted under 35 U.S.C. 154(b) by 307 days.

(21) Appl. No.: 09/762,859

(22) PCT Filed: Jun. 13, 2000

(86) PCT No.: PCT/CH00/00322
§ 371 (c)(1),
(2), (4) Date: Apr. 20, 2001

(87) PCT Pub. No.: WO00/79666
PCT Pub. Date: Dec. 28, 2000

(30) Foreign Application Priority Data

Jun. 17, 1999 (EP) ............................................. 99810538

(51) Int. Cl.$^7$ ................................................. H02H 5/04
(52) U.S. Cl. ........................................... 361/31; 361/103
(58) Field of Search ............................... 361/23, 24, 25, 361/27, 28, 29, 31, 58, 103, 106; 318/471; 340/527, 648, 664; 338/22 R

(56) References Cited

U.S. PATENT DOCUMENTS

| 5,530,613 | A |   | 6/1996  | Bauer et al. | 361/58 |
|-----------|---|---|---------|--------------|--------|
| 5,617,281 | A | * | 4/1997  | Bauer et al. | 361/27 |
| 6,492,799 | B1| * | 12/2002 | Rajala et al.| 324/86 |

FOREIGN PATENT DOCUMENTS

| DE | 4118346 C1 | 9/1992 | .......... H01H/85/30 |
| DE | 4213443 C1 | 1/1994 | .......... H01H/85/30 |
| EP | 0655760 B1 | 5/1995 | .......... H01H/33/16 |

* cited by examiner

Primary Examiner—Ronald W. Leja
(74) Attorney, Agent, or Firm—Burns, Doane, Swecker & Mathis, L.L.P.

(57) ABSTRACT

The invention relates to an apparatus for limiting an electrical current by using a PTC resistor being monitored by a monitor circuit. According to the invention, the monitor circuit issues a signal only after detecting the status of the PTC resistor for a defined time period after a PTC resistance change.

10 Claims, 4 Drawing Sheets

APPARATUS FOR LIMITING AN ELECTRICAL CURRENT

FIELD OF THE INVENTION

The present invention relates to an apparatus for limiting an electrical current in an electrical line. The apparatus comprises a PTC resistor to effect said limiting function.

A PTC resistor as such is state of the art and well known to have a transition between a low resistance status and a high resistance status that is temperature dependent and thus can be triggered by the amount of current carried by the PTC resistor.

Further, the apparatus according to the invention comprises a monitor circuit for monitoring the status of the PTC resistor.

PRIOR ART

Monitoring the status of PTC resistors is known from DE 43 40 632 A1. Therein the voltage across a PTC resistor being connected in series with a load break switch is used to trigger the opening of the load break switch. The PTC resistor is intended to improve the current limiting capability of the load break switch which finally interrupts the current.

Prior art U.S. Pat. No. 5,530,613 discloses an apparatus for limiting an electrical current in an electrical line. According to this document, triggering of PTC resistors is monitored. In case of triggering, a switch shall be opened that is exemplified by a contactor. This contactor is used for short-circuit current interruption. Another embodiment shows a combination of a contactor and a circuit interrupter switch, however, without a monitor circuit for monitoring the PTC resistors. The additional switch is provided in order to have independent means for disconnecting.

Further, DE 42 13 443 and DE 41 18 346 are mentioned which show monitoring of conventional fuses.

SUMMARY OF THE INVENTION

The technical problem underlying the present invention is to provide an apparatus for limiting an electrical current with improved efficiency.

According to the invention, this technical problem is solved by an apparatus for limiting an electrical current in an electrical line comprising a PTC resistor having, alternatively, a high and a low resistance status, in said line and a monitor circuit for, in case of a change from said low resistance status to said high resistance status, detecting the status and producing a signal if said high resistance status is present, a switch in said line and in series connection with said PTC-resistor for interrupting an electrical current in said line limited by said PTC resistor, responsive to said signal indicating said high resistance status, characterized in that said monitor circuit is adapted to detect said resistance status for a defined time period after said change and to produce said signal only if that high resistance status is present for said time period and that said apparatus is adapted to open said switch in case of high overcurrents and further comprises a contactor to be opened in case of small overcurrents.

The basic idea of the invention is that a change of the PTC resistor from its low resistance status to its high resistance status does not necessarily indicate a situation, where the monitor circuit should issue a signal. The signal can be used for signalizing purposes, e. g. to inform a control and supervision centre or to drive a lamp or display, additionaly to being used to activate another circuit, e. g. to open a switch. The invention is based on the experience that some of the situations leading to a status change of the PTC resistor can be handled by means of the PTC resistor only. E. g. short overcurrents can eventually trigger the PTC resistance change without really posing a problem that goes beyond the current limiting capabilities of the PTC resistor.

In contrast to the cited prior art wherein PTC resistors are monitored in order to open a switch in every occurring case of a PTC resistance change, the invention is based on the statement that in some of these situations the opening of the switch is not necessary, actually. In other words: The cited prior art regards the PTC resistor to be an additional element for improving the current limiting capability of a switch wherein the interrupting action of the switch shall only be improved (but not replaced). The invention, to the contrary, regards the PTC resistor to be a functional device for itself. That means that the invention does not aim at triggering the switch in each case of a PTC resistance change.

According to the invention, the measure to discriminate between those cases of a PTC resistance change in which a signal shall be issued by the monitor circuit and the remaining cases in which the monitor circuit shall not respond on such a change, is given by a time period of continued detection of the status of the PTC resistor after the resistance change of the PTC resistor. This time period shall be a defined one which preferably means a predetermined—but with this predetermination fixed—time period, but can also mean a time period varied in some defined way. Within this time period, preferentially, the status of the PTC resistor is monitored by means of detecting the voltage across the PTC resistor. The advantage of these solutions is that they enable a very rapid monitoring of the PTC resistor status compared to other alternatives as temperature detection, detection of mechanical changes such as increasing length or others. Namely, in case of an overcurrent through the PTC resistor lasting only for a short time, the voltage across the PTC resistor will drop as soon as the overcurrent situation is finished. The material changes within the PTC resistor could, however, last for longer time, i. e. the cooling of the PTC material could possibly need more time than the actual overcurrent situation has taken. Therefore, if the time delay according to the invention shall be shortened, it might happen that only by detecting the voltage during that time period it can really be decided, whether at the end of that time period the overcurrent situation is still present or not.

As stated above, the invention relates to a combination of the PTC resistor with the monitor circuit and a switch in line with the PTC resistor, controlled by the signal of said monitor circuit. Such a switch could be a load break switch or switch fuse. The large current interrupting capability of a real circuit breaker switch is not necessary in each application of the invention, mostly because the PTC resistor reduces the current to be switched after the PTC resistance change. However, the invention can also be worked with a circuit breaker. An advantage of this could be that one does not depend on the current limiting function of the PTC resistor which could fail, principally.

Additionally to a load break switch, a circuit breaker or another switch, a contactor is used in series with the switch and the PTC resistor for two main reasons: Contactors have large duty life values, i. e. they are adapted to large numbers of switching operations. Therefore, they are suitable for an (intentional) operational on/off switching of a load which usually occurs much more often than overload situations and can be operated from a supervision center. Further, such a contactor shall be driven by a thermal relay responding on small overcurrents in the same line which are below the threshold value of the PTC resistor but, if continued, too high to be tolerated.

According to a preferred embodiment of the invention, the resistance status of the PTC-resistor is not only used to produce a signal for opening the switch, but moreover to produce a signal for opening a contactor only in case of only small overcurrents.

A suitable choice for the PTC resistor is a PTC-polymer resistor as known in the art.

Furthermore a PTC polymer resistor has been proposed with two filling powders, one of a conductive material and the other one of a phase transition material. The phase transition material absorbs a phase transition energy at a phase transition point which is at a lower critical temperature than the critical temperature of the PTC resistance change. Thereby, an adaption of the PTC response characteristic to the start-up characteristics of an electrical motor can be achieved.

Still further, another preferred aspect of the invention relates to a circuit design to detect the voltage cross a three-phase PTC resistor by using two star points, each combining three taps of in total six taps on both sides of the three-phase PTC resistor. This aspect of the invention is also described hereunder.

DESCRIPTION OF PREFERRED EMBODIMENTS

In the following, the invention will be described with reference to the figures which show preferred embodiments of the invention.

The preceding as well as the following description of this invention has to be understood as disclosing the invention as apparatuses and circuits as well as disclosing their respective operating methods.

The invention will be described with embodiments being power supplying and protecting circuits for an electrical motor. However, all these power supplying and protecting circuits include a monitor circuit according to the invention, the common structure of which is principally shown in FIG. 1.

The monitor circuit is referenced with numeral 1. Monitor circuit 1 monitors three single-phase PTC resistors PTC1–PTC3 shown in the left hand side of FIG. 1. Fuses could be used instead, which are common in motor protecting systems. A main difference is that PTC resistors are resetable, i. e. need not be exchanged after tripping. Using fuses instead of PTC resistors, however, does not change the structure at all.

PTC resistors PTC1–PTC3 are connected in a respective single phase line $L_1$, $L_2$ and $L_3$, respectively, which form a three-phase line L. Line L leads to an electrical motor M, wherein the part between PTC resistors PTC1–PTC3 is distinguished by an apostrophe from the part on the other side of resistors PTC1–PTC3.

Figure 1:
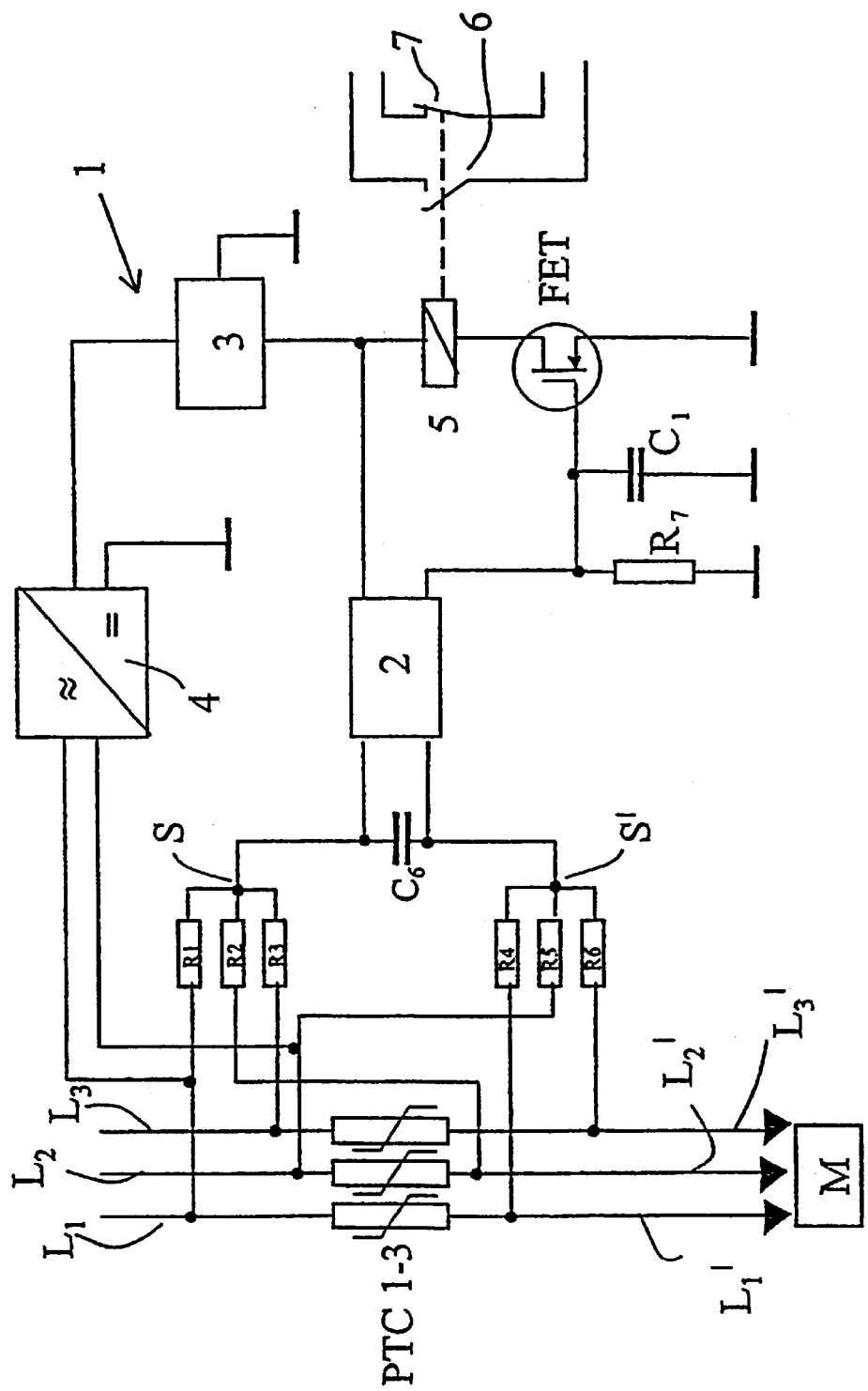
FIG. 1 shows a schematic circuit diagram of a monitor circuit according to the invention.

FIG. 1 shows that respective taps at lines $L'_1$, $L'_2$, $L_3$ and $L'_1$, $L_2$, $L'_3$ are connected with star points S and S' via resistors R1, R2, R3 and R4, R5, R6, respectively. Resistors R1–R6 all have the same resistance value. Therefore, star point S has the arithmetic mean value of the potentials of $L_1$, $L'_2$, $L_3$ and star point S' the mean value of potentials $L'_1$, $L_2$, $L'_3$. A voltage between both star points S, S' charges a capacitor $C_6$ and is fed to an optical coupling 2.

Within optical coupling 2, a LED is driven by the star point voltage and produces a light signal representing said voltage. A photo diode receives said light signal and is changed in its resistance value responsive to said light signal and thus responsive to said star point voltage. The terminals of the photodiode represent an output side of optical coupling 2.

A power supply circuit 4 comprising a rectifier is connected to two of said lines, e. g. to $L_1$ and $L_2$. A transformer could be included, as mentioned above. An output DC voltage of power supply circuit 4 is fed to one output terminal of optical coupling 2 via a signal lamp circuit 3 for optical signalizing a current. The other output terminal of optical coupling 2 is grounded via a capacitor $C_1$ and a parallel resistor $R_7$ and fed to a gate terminal of a FET the source terminal of which is grounded. A relay 5 is connected between a drain terminal of the FET and said output terminal of optical coupling 2 fed with the DC potential of power supply circuit 4. Relay 5 simultaneously opens and closes two relay switches 6, 7.

According to the results of the inventors, a FET has proven to be advantageous compared to other transistor types.

The operation of monitor circuit 1 is as follows: if any one or any two of PTC resistors PTC1–PTC3 or all three trigger, i. e. change their resistance from a low to a high value responsive to a current higher than a certain threshold value, capacitor C6 between star points S, S' charges to a substantial voltage within a certain time period. This voltage of capacitor C6 leads to a low resistance of the output side of optical coupling 2. Thereby, the gate of the FET is drawn to the DC potential of power supply circuit 4. Capacitor C1 and resistor $R_7$ provide for a certain time delay in the gate voltage swing of the FET whereas the optical coupling 2 provides for a galvanic separation from the potentials at capacitor C6. This galvanic separation is advantageous in two respects: First, the DC side of power supply circuit 4 can be related to ground potential whereas star points S, S' can principally have a floating potential, i. e. only the voltage between star points S, S' is measured independent of their absolute potential. Second, the high potentials of three-phase line L, L' are galvanically separated from the right hand side in FIG. 1. In this respect, power supply circuit 4 can include a separation transformer on the AC side.

The gate voltage swing renders the FET conductive leading to a current flow through a winding of relay 5 and through lamp 3. Consequently, lamp 3 signalizes the triggered status of the three-phase PTC resistor and relay 5 starts its switching action, i. e. closes normally-off switch 6 and opens normally-n switch 7. These two switches 6, 7 are provided for in order to meet various applications with one standard monitor circuit. The switching action of relay 5 is the signal of monitor circuit 1. Due to resistor $R_7$ the fuse monitor is automatically reset after operation as the PTC resistors.

It is to be noted that the signalizing function of lamp 3 and the switching action of relay 5 do not depend on the details of which one or two single phase PTC resistors PTC1–PTC3 or whether all three have been triggered. The response time of the monitor circuit and its sensibility to disturbances on line L, L', e. g. during start-up of motor M, can be tuned by the capacitance values of capacitors C6 and C1 and the value of $R_7$. According to the results of the inventors, capacitor C1 and resistor $R_7$ are preferably used to tune the detection time period whereas capacitor C6 is used to improve the disturbance insensitivity of monitor circuit 1 especially during motor start up. Concerning the detection time period, the inventors have found that in most cases it is appropriate to wait for at least one or two half-waves after the time of status change of three-phase PTC resistor PTC1–PTC3 until relay 5 respond. In case of a 50 Hz application this corresponds to a time period of at least 10 ms or 20 ms. Further preferred values for a minimum time period are 30, 40, 50 ms. However, also time periods between e. g. 100 ms and 200 Ms can be appropriate, especially in case of PTC resistors which stand even high voltages for the appropriate time period. In tuning the described time period, the gate onset voltage of the FET has to be taken into account.

Figure 2:
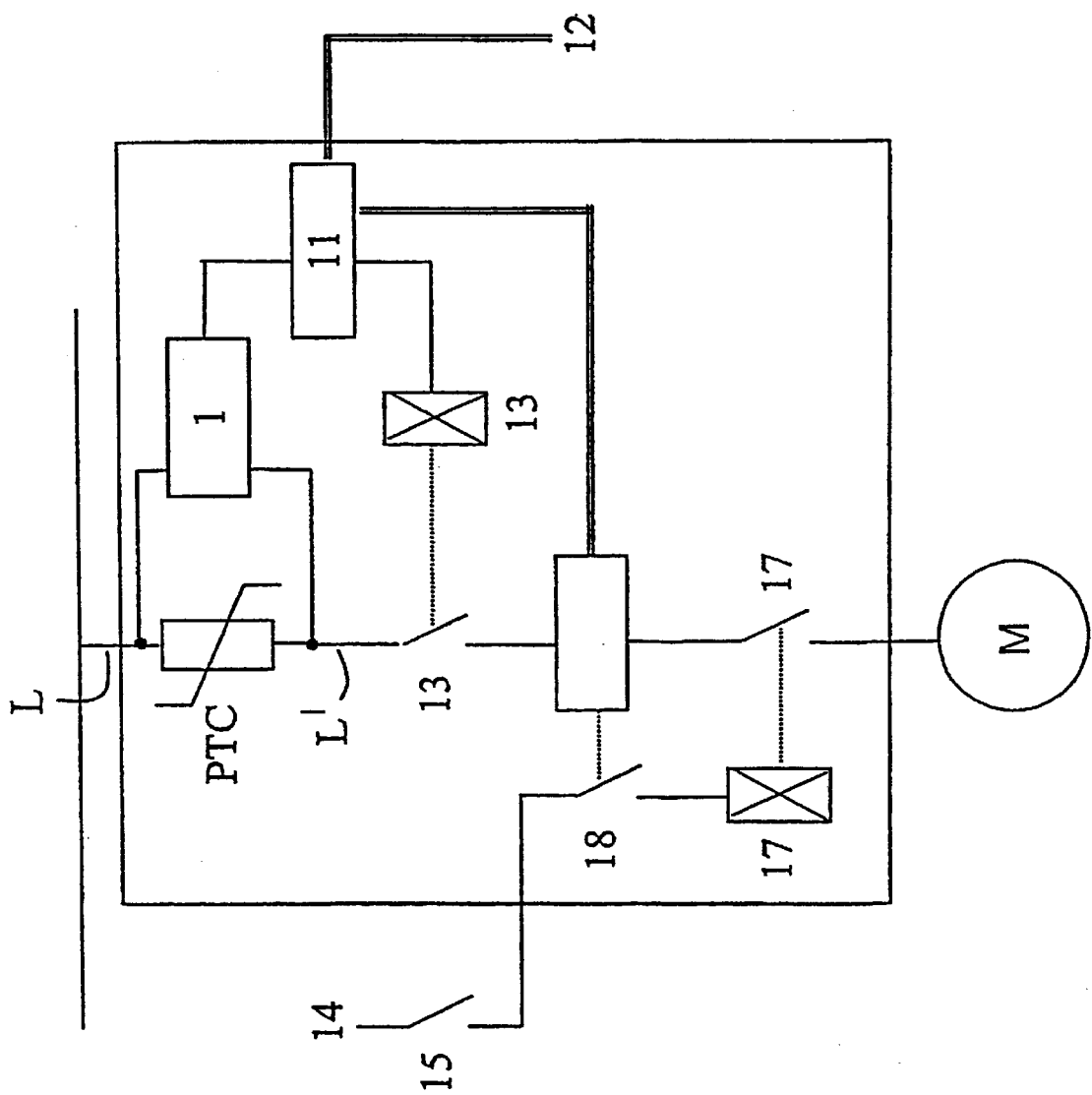
FIG. 2 shows a schematic circuit diagram of a motor power supplying and protecting circuit including the invention according to a first embodiment.

FIG. 2 shows an application of this monitor circuit in a complete power supplying and protecting system for electrical motor M. For simplicity, the schematic structure of FIG. 2 only refers to one phase in contrast to FIG. 1. However, this has to be regarded as a symbolic representation of an actual three-phase circuit.

Monitor circuit 1 monitors the star point voltage across three-phase PTC resistor PTC as discussed above. The switching action of relay 5 within monitor circuit 1 is used to produce a signal which is fed to an electronic circuit 11. Electronic circuit 11 serves as an interface for a remote control communication line referenced by numeral 12. Thereby, the monitor status can be communicated to the remote control and the remote control may be able to control the protecting system independently from monitor circuit 1 by opening a load break switch 13, to be described below, via the electronic circuit 11. Thereby, an emergency stop of electrical motor M can be accomplished independently from the electrical situation within the power supplying and protecting circuit, i. g. if the motor temperature is too high or if another emergency situation has been detected by the remote control.

Besides of this remote control, the signal of monitor circuit 1 controls the switching action of a load break switch 13 interrupting three-phase line L'. It has to be noted by the way, that in case of thermal fuses instead of PTC resistors, it would be preferred to provide for two load break switches 13, one on each side of the fuses in order to make the fuse contacts potential free for a safe exchange, namely a switch disconnector.

In the first embodiment shown in FIG. 2, load break switch 13 is followed by an electronical thermal relay 18, that controls the switching action of a contactor 17 also in line with load break switch 13 and thermal relay 18. Usually, thermal relay 18 is normally on so that a starter switch 15 power-supplied from a terminal 14 can be used to start and stop motor M by means of contactor 17, which is normally off, consequently. Starter 15, thermal relay 18 and contactor 17 are conventional art and need not to be described in detail.

Using relay 5 with normally-off switch 6 and nonnull-on switch 7 in monitor circuit 1 and activating a further (load break) switch 13 has the advantage, that a standard monitor circuit can be used for different applications, i. e. different types of switches 13 with different sizes and control characteristics as well as for control of one ore more switches 13. In this way, relay 5 provides for two signals of monitor circuit 1.

By using an electronical thermal relay 18, also the thermal overload status can be monitored by remote control line 12. The electronical thermal overload relay 18 detects a small overcurrent, e.g. by means of a Hall sensor. The detection of small overcurrents could also be accomplished by electronic circuit 11.

Disconnector 17 could be a microrelay switch as disclosed. It is known in the art, that Hall sensors can also be integrated in microelectronic circuits. Hence elements 17 and 18 could be one microelectronical device.

When a fault has been detected by the monitor circuit, first the line(s) can be interrupted by actuating contactor 17 via relay 18. If the contacts of contactor 17 are welded or it can not be opened within a certain time for other reasons, the load break switch can be opened for safe interruption.

Figure 3:
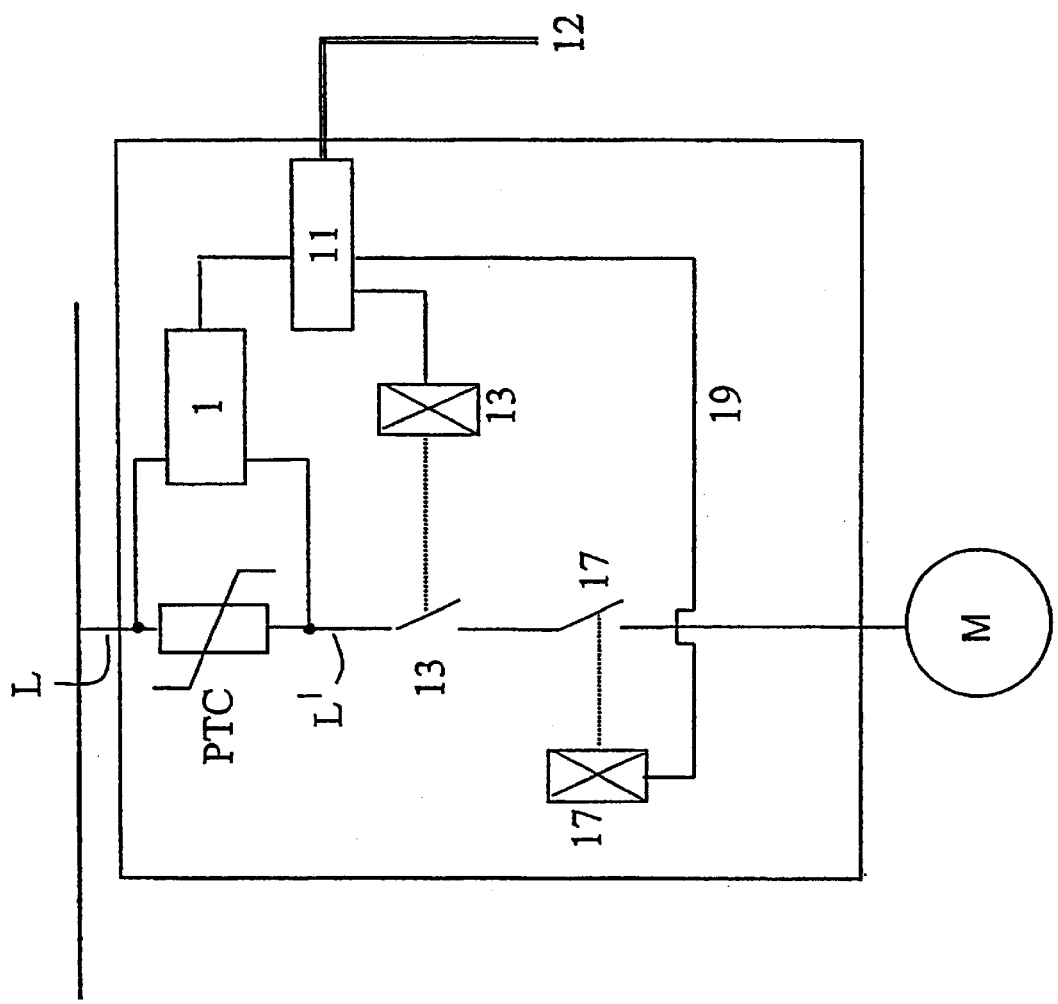
FIG. 3 shows a schematic circuit diagram of a motor power supplying and protecting circuit including the invention according to a second embodiment.

A second embodiment is shown in FIG. 3. Again, elements similar to elements in FIG. 2 are referenced by identical numerals. Here, remote control line 12 is also used as start-up signal line. Consequently, electronic circuit 11 controls contactor 17 by means of line 19. Therefore, relay 18 of FIG. 2 need not be included. Further, electronic circuit 11 includes means for thermal overload detection, e. g. a Hall sensor, not shown in FIG. 3.

Alternatively, a thermal overload detection within electronic circuit 11 is not necessary if PTC resistor PTC is adapted to motor protection requirements, i. e. has a response characteristic adapted to the start-up current of electrical motor M. In this case, the PTC resistor on the one hand shows a sufficient response to small long-lasting overcurrents to fulfil the thermal overload protection requirements and, on the other hand, will not trigger during motor start-up.

Figure 4:
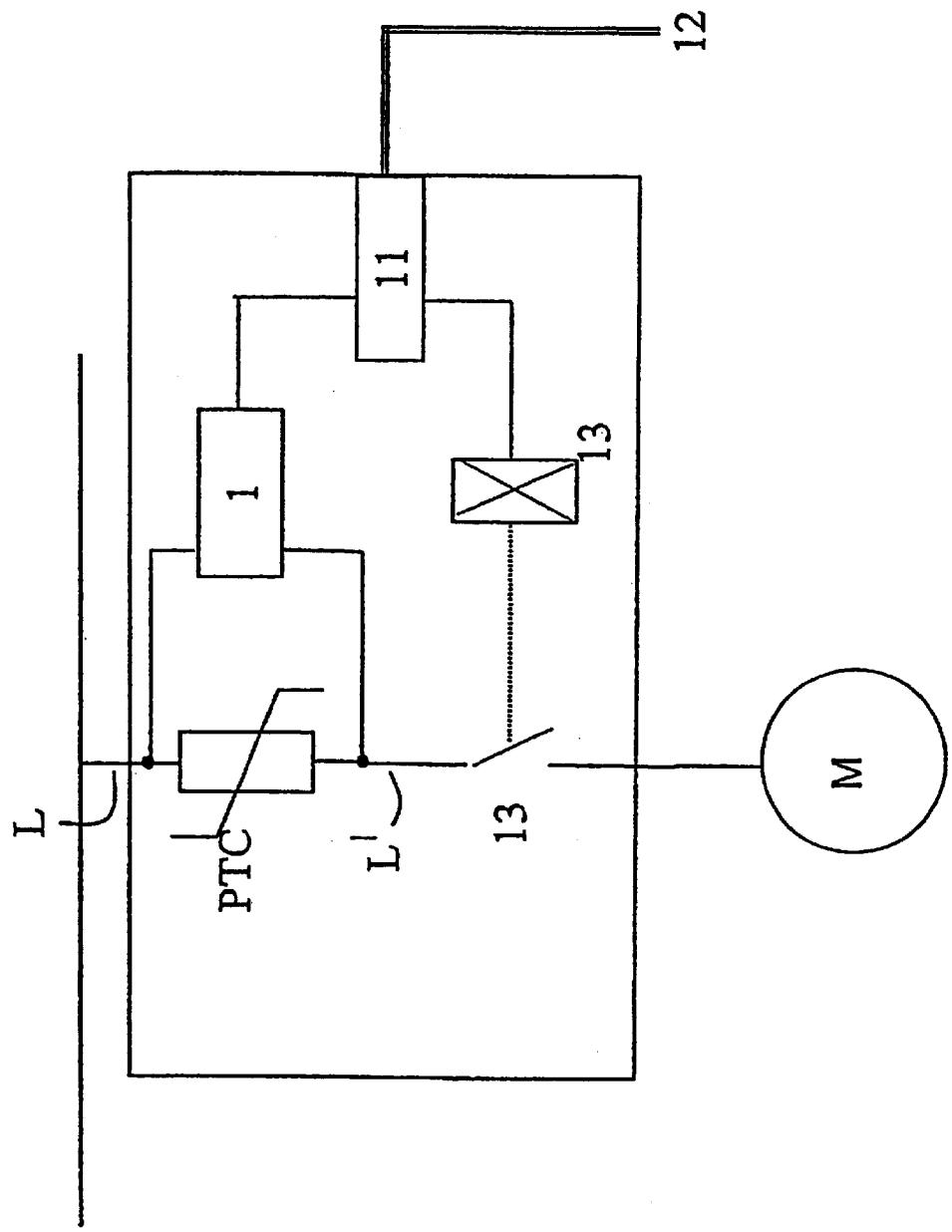
FIG. 4 shows a schematic circuit diagram of a motor power supplying and protecting circuit including the invention according to a third embodiment.

Finally, FIG. 4 shows a last embodiment in which like reference numerals as in the foregoing embodiments are used. However, contactor 17 has been omitted also. In this embodiment, load break switch 13 fulfils contactor requirements concerning duty cycle life (e. g. $10^7$ operations). Therefore, load break switch 13 can also be used to start and stop motor M.

What is claimed is:

1. An apparatus for limiting an electrical current in an electrical line comprising a PTC resistor having, alternatively, a high and a low resistance status, in said line and a monitor circuit for, in case of a change from said low resistance status to said high resistance status, detecting the status and producing a signal if said high resistance status is present, a switch in said line and in series connection with said PTC-resistor for interrupting an electrical current in said line limited by said PTC resistor, responsive to said signal [(5)] indicating said high resistance status, wherein said monitor circuit is adapted to detect said resistance status for a defined time period after said change and to produce said signal only, if that high resistance status is present for said time period, and the said apparatus is adapted to open said switch in case of high overcurrents and further comprises a contactor to be opened in case of small overcurrents.

2. An apparatus according to claim 1, wherein said time period is predetermined.

3. An apparatus according to claim 1, wherein said status is monitored and detected by means of the voltage across said PTC resistor.

4. An apparatus according to claim 1, wherein said apparatus is adapted to open that contactor in case of small overcurrents, responsive to a signal of that monitor circuit indicating a small overcurrent.

5. An apparatus according to claim 1, wherein said switch is a load break switch.

6. An apparatus according to claim 1, wherein said switch is a microrelay switch.

7. An apparatus according to claim 1, wherein said PTC resistor is a PTC-polymer resistor.

8. An apparatus according to claim 7, wherein said PTC resistor comprises a polymer matrix, a first filling powder of a conductive material and a second filling powder comprising at least one phase transition material, wherein said phase transition material absorbs a phase transition energy when heated over a first critical temperature being lower than a second critical temperature of a change of said PTC resistor between said low and said high resistance status.

9. An apparatus according to claim 7, wherein said PTC resistor comprises a restriction of a cross section area perpendicular to a main current direction, an opening angle in a plane including said main current direction of said constriction being at least 100°.

10. An apparatus according to claim 1, wherein said line is a three-phase line, said PTC resistor comprises three single-phase PTC resistors and said monitor circuit comprises six taps, one respective tap at a first and a second side of each single phase PTC resistor, said taps being divided into two groups of three taps each, two star points, said three taps in each group being connected to one respective star point for each group via a respective resistor, and a voltage detector for detecting a voltage between said star points and producing said signal according to a result of said detection.

* * * * *